United States Patent
Mockler (10) Patent No.: US 7,436,433 B2
(45) Date of Patent: Oct. 14, 2008

(54) DIGITAL CAMERA OR DIGITAL VIDEO CAMERA AND METHOD FOR ACQUIRING IMAGES

(76) Inventor: Rainer Mockler, Heuholzer Weg 2, Heilbronn (DE) D-74076

( * ) Notice: Subject to any disclaimer, the term of this patent is extended or adjusted under 35 U.S.C. 154(b) by 841 days.

(21) Appl. No.: 10/258,103

(22) PCT Filed: Apr. 21, 2001

(86) PCT No.: PCT/DE01/01533

§ 371 (c)(1),
(2), (4) Date: Dec. 11, 2002

(87) PCT Pub. No.: WO01/82592

PCT Pub. Date: Nov. 1, 2001

(65) Prior Publication Data

US 2003/0164880 A1    Sep. 4, 2003

(30) Foreign Application Priority Data

Apr. 25, 2000  (DE) ............... 100 20 260
Apr. 25, 2000  (DE) ............... 100 20 261

(51) Int. Cl.
    *H04N 5/225*    (2006.01)
(52) U.S. Cl. ............... 348/207.99; 348/333.01
(58) Field of Classification Search ............ None
    See application file for complete search history.

(56) References Cited

U.S. PATENT DOCUMENTS

| | | | |
|---|---|---|---|
| 5,508,734 A * | 4/1996 | Baker et al. .......... | 348/36 |
| 5,900,909 A * | 5/1999 | Parulski et al. ...... | 348/231.6 |
| 6,141,051 A * | 10/2000 | Koch et al. ......... | 348/345 |
| 2006/0082657 A1* | 4/2006 | Meier ................ | 348/208.7 |

* cited by examiner

*Primary Examiner*—Tuan Ho
*Assistant Examiner*—Dillon Durnford-Geszvain
(74) *Attorney, Agent, or Firm*—Cohen Pontani Lieberman & Pavane LLP

(57) ABSTRACT

The invention relates to a digital camera or digital video camera comprising an circular objective, a sensor (5) for acquiring and digitizing image information and means for storing the digitized image information, in which all of the image information projected by the objective and contained in an image circle is acquired, disguised and stored for further processing. A digital camera of this type enables full use to be made of the objective capacity.

18 Claims, 7 Drawing Sheets

DIGITAL CAMERA OR DIGITAL VIDEO CAMERA AND METHOD FOR ACQUIRING IMAGES

PRIORITY CLAIM

This is a U.S. national stage of application No. PCT/DE01/01533, filed on 21 Apr. 2001. Priority is claimed on that application and on the following applications: Country: Germany, Application No.: 100 20 261.6, Filed: 25 Apr. 2000; and Country: Germany, Application No.: 100 20 260.8, filed 25 Apr. 2000.

BACKGROUND OF THE INVENTION

1. Field of the Invention

The invention relates to a digital camera or a digital video camera having a lens element, having a sensor for capturing and digitizing image information and having means for storing the digitized image information, and a method for capturing images.

2. Description of the Prior art

In known digital cameras, an image is projected onto a sensor surface arranged in the digital camera using the lens element. Here, the format of the recorded image corresponds to the format of the sensor surface and generally corresponds to the rectangular small image format. It is possible neither to select nor change the image format before or after the recording. All that is possible is to subsequently edit the recorded image on a computer. On the other hand, it is advantageous that the recorded image can be viewed immediately on a display and an unsatisfactory recording, because for example the heads of photographed persons have been cut off, can be repeated immediately. In order to record images in portrait format the digital camera must be rotated 90° from the normal position.

In known large image cameras, an image is projected through the lens element onto a ground glass panel which is held by a rear standard. The format of the recorded image is determined by the format of the ground glass panel. The image area is larger in relation. As a result of the fact that in large image cameras the rear standard and the lens element can be displaced relative to one another and relative to the main housing of the large image camera, an excerpt of the image area projected by the lens element can be selected before the recording of an image. The method of the parallel displacement of the lens element with respect to the rear standard is applied, for example, if it is not possible to record an image of an object from the front as a free view is impeded by another object. In such cases, the recording can be made from a lateral standpoint and is nevertheless identical in all parts with the recording from the front. If an error happens to have occurred during parallel displacement, this cannot be eliminated after the recording as the selection of the image excerpt has to have been made beforehand.

APS cameras are understood to be cameras in which one of three image formats can be selected before an image is recorded. The selection of the image format is stored with the respective image on the film, so that when the film is developed no image information is lost. However, even in these cameras the selection of the image format, and thus the image excerpt from the image area projected by the lens element must already be made before the recording. Only after the development of the film is it possible to determine whether the correct format has been selected and whether the desired image information is contained in the recorded image.

OBJECT OF THE INVENTION

The object of the invention is to develop a digital camera or a digital video camera with improved capturing of images.

This object is achieved in that means are provided for capturing, digitizing and storing the entire image information which is imaged by means of the lens element and contained in an image area.

With such a digital camera or digital video camera the power of the lens element is utilized completely. Much more image information by far is recorded and stored than in conventional cameras in which only one excerpt from the image area projected by the lens element is recorded. In conventional cameras, either one image format, and thus the size of an image excerpt from the image area, are already predetermined or the user must make a selection among three recording formats (APS), and thus among image excerpt sizes, before the image is recorded. In the camera according to the invention this necessity is eliminated as all the image information contained in the image area of the lens element is recorded and stored.

If a conventional camera has to be turned in order to make a selection between landscape format and portrait format, the need to do this is also eliminated when the entire image area is recorded.

In one particularly preferred embodiment, a circular display for displaying the image area is provided on the digital camera or digital video camera. The photographer is thus provided with the possibility of viewing the entire image area projected by the lens element before the image is recorded. In addition, the stored image can be viewed after the recording.

In one advantageous refinement, the digital camera has a circular viewfinder and a circular sensor for capturing images. These elements are thus matched in an optimum way to the image area projected by the lens element. In this way, the surface of the sensor and of the viewfinder window are optimized as no unused excess parts of the area are produced as would be the case where rectangular shapes are used.

In one particularly referred refinement of the invention, the digital camera or digital video camera has means for equalizing in terms of perspective the digitized image information which is projected by the lens element and captured by the sensor. This measure can also be used in cameras which do not cover the entire image area. An independent invention can thus be seen in this. Equalization and correction are understood according to the invention as amounting to distortion of the images until tumbling lines become nontumbling lines. If the perspective is changed further beyond the corrected state or generally a perspective which is not present is generated, this is to be considered as distortion according to the invention.

With such a digital camera, a wide variety of possibilities for influencing the perspective of an image are obtained. On the one hand, the perspective of an image which is recorded with an inclined camera can be corrected automatically, so that no tumbling lines are produced. Subsequent manual switching can, however, for example also amplify distortion of a perspective, or it is possible for a perspective to be produced which does not in fact exist. However, in particular the pivoting of the lens element and/or rear standard in order to correct perspectives is eliminated. This ensures simpler handling.

In one particularly preferred embodiment of the camera according to the invention, the camera has an inclination sensor. The inclination sensor detects how far the camera, and thus the sensor which records the image, is pivoted from the perpendicular or with respect to the horizontal. The value which is measured by the inclination sensor can be used to equalize the capture image immediately in such a way that real perpendicular lines are represented as perpendicular lines. The equalization can be immediately carried out automatically so that the user sees only the equalized image on the display or in the viewfinder and the equalized image is stored when the trigger is activated. Alternatively, the equalized image can be displayed and stored and the inclination value and/or the image angle can be stored along with the image file. During subsequent processing with the camera or on a computer, the equalization can be carried out with reference to the stored inclination value and/or the image angle with reference to one or more vanishing points.

If the capturing means, in particular the sensor, are rotatably mounted, when the camera is inclined with respect to the horizontal, the sensor can always be rotated in such a way that the sensor, and thus the recorded image, is aligned with the horizontal.

The camera advantageously has an oblique position sensor. In this way it is possible to register the degree of inclination of the camera with respect to the horizontal and the amount by which the sensor has to be rotated. It is possible, for example, to provide an optical plumbline as the oblique position sensor.

In one advantageous development, an actuator motor is provided with which the rotatably mounted capturing means can be rotated in accordance with the inclination measured by the oblique position sensor. The sensor is thus automatically aligned horizontally without the need for intervention by the user.

It is advantageous if means are provided for selecting one or more image excerpts from the image area. Excerpts with any desired geometrical shapes and of any desired geometrical size can be selected from the image using selection means. These selection means can be, for example, function-activating keys or pins. There is no risk that after the development of an image it will be found that the wrong excerpt from the image area has been recorded. The selection of the image excerpt does not need to be made before the image is recorded but rather can be performed at any desired later time. The user is also provided with the possibility of selecting an excerpt and then enlarging it subsequently. The selection of the image excerpt is preferably carried out on the display of the camera.

In one development of the digital camera or digital video camera according to the invention, means are provided for transferring the stored image area and/or the stored image excerpts to an external device, preferably a computer or printer. After the transfer, the stored image areas or image excerpts can be deleted from the storage medium of the camera so that storage space is available for further recordings. The transferred image areas or image excerpts can be further processed and stored on a computer using methods known per se and printed out. In addition, it is possible for image excerpts from the image area to be selected only with the computer. As a result, no storage space for the image excerpts is required in the digital camera. In particular in digital video cameras it is advantageous if the image excerpts can also be selected at approximately the same time as the film is edited on the computer.

A further aspect of the invention relates to a method for capturing digitized images with a digital camera or a digital video camera, the entire image area which is imaged by the lens element of the camera being captured, digitized and stored. The photographer is therefore provided with more image information than is the case if just one excerpt of the image area of a lens element is recorded. The photographer is also subsequently provided with the possibility of selecting an image excerpt from the image area. When a first object is recorded from a lateral standpoint, it being impossible to record an image of said object from the front because of a second object which is located in between, an image excerpt which contains the first object can be selected from the image area without any need for parallel displacement of the lens element.

In one preferred method variant, the digitized images are equalized or distorted in terms of perspective and stored. Using such a method it is possible to correct undesired perspectives, for example owing to the camera being held with an incline, and to amplify perspectives.

In one preferred variant of the method, the digitized images are equalized automatically in accordance with an inclination measured by the first inclination sensor in such a way that real perpendicular lines are imaged as perpendicular lines. The user does not need to be concerned with the position of the camera. The complicated adjustment of the rear part of the camera, as occurs with known large image cameras, is dispensed with if large objects are to be photographed with vertical lines from a low or elevated standpoint. In particular for the professional photographer this constitutes a large degree of simplification in the handling of a camera, in particular in the case of aerial photography.

In a further variant of the method, an inclination value which is measured by the inclination sensor is stored with each recorded image. An image can thus be recorded with distortion. The user then has the choice either to perform the equalization later in accordance with the stored inclination value or to leave the image as it was recorded. In addition, he has the possibility of storing or outputting the image in equalized and distorted forms.

Alternatively, the digitized images can be manually equalized or distorted in a selective fashion. The user can generate any desired perspectives. Particular features of an image can thus be emphasized. Moreover, perspectives can be amplified or perspectives can be generated which do not in fact exist. This is intended to mean that, for example, distortion is performed in the vertical direction when making a portrait format recording with a camera which normally equalizes in the horizontal direction in landscape format, that is to say distortion is carried out in a direction in which perspective distortion normally does not occur.

One preferred variant of the method according to the invention is defined in that an image excerpt is selected from a recorded image or image area and subsequently further processed. The user can subsequently select the image excerpt which is of particular interest. It is no longer necessary to rotate the camera to make a recording in the portrait format. It is sufficient to select an excerpt in portrait format from the image area. The risk of inadvertently failing to capture important detailed information is eliminated by virtue of the fact that the entire image area is recorded. The possibility of selecting an excerpt from an image makes it possible to remove unimportant image information, for example large foregrounds, as a result of which the image is reduced to the essential. The selected excerpts can be enlarged and further processed using methods known per se.

Further advantages of the invention emerge from the description and the drawing. The features which are mentioned above and explained further below can likewise be used according to the invention respectively on an individual basis or combined in any desired ways. The embodiment which is shown and described is not to be understood as restrictive in its number but rather has an exemplary character for the description of the invention.

BRIEF DESCRIPTION OF THE DRAWINGS

Exemplary embodiments of digital cameras according to the invention and objects which are known from the prior art are represented in the schematic drawing and will be explained in the following description. In the drawings, wherein like reference characters denote similar elements throughout the several views:

FIG. 1b is a side view of the digital camera according to FIG. 1a;

FIG. 1'a is a front view of an obliquely positioned digital camera according to the present invention;

FIG. 1'b is a side view of the digital camera according to FIG. 1a;

FIG. 1'c is a rear view of the digital camera according to FIG. 1'a and FIG. 1'b;

FIG. 1'h is the digital camera in FIGS. 1'a to 1'c with an aligned sensor;

FIGS. 1d to 1g are schematic views of the image areas projected by the lens element of the digital camera shown in FIG. 1a;

FIG. 4b is a rear view of the digital camera according to FIG. 4a;

FIG. 6b is the recorded image according to FIG. 6a;

FIG. 7b is the image recorded according to FIG. 7a;

DETAILED DESCRIPTION OF THE PREFERRED EMBODIMENTS

Figure 1:
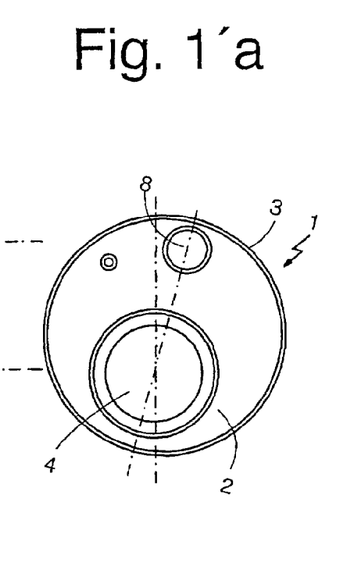
Figure 1A:
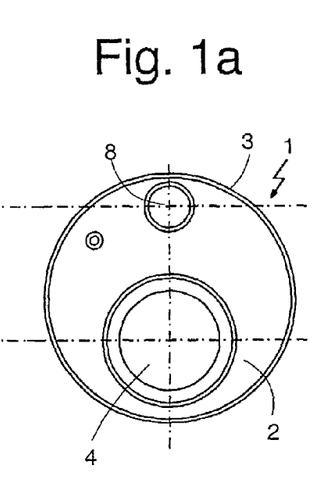
FIG. 1a is a front view of a digital camera according to the present invention.
Figure 1B:
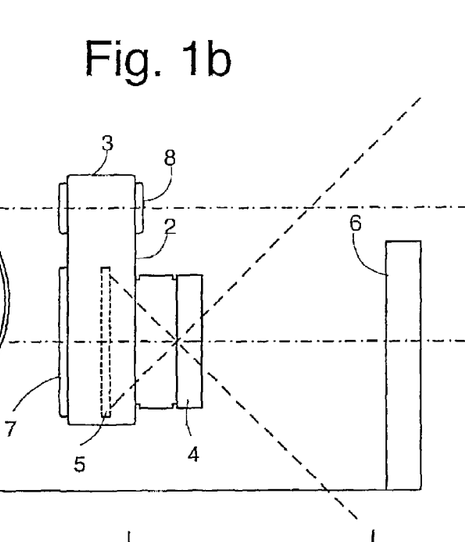
Figure 1C:
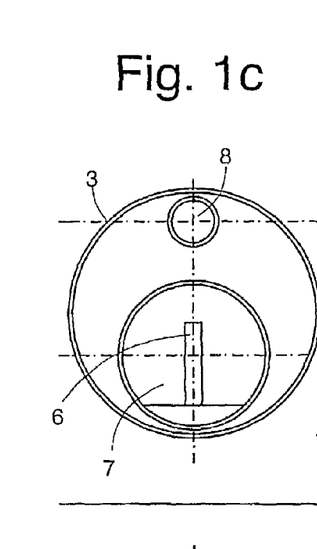
FIG. 1c is a rear view of the digital camera according to FIGS. 1a and 1b.
Figure 1D:
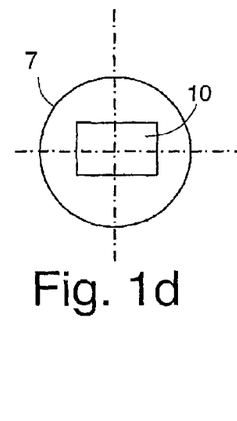
Figure 1E:
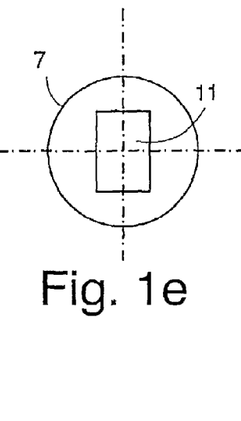
Figure 1F:
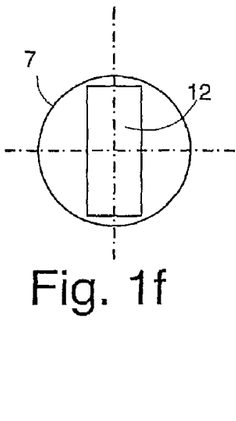
Figure 1G:
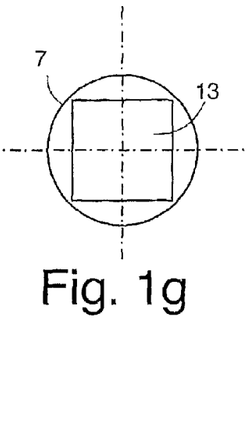

FIGS. 1a to 1c are front, side, and rear schematic views of a digital camera 1. A lens element 4 with a lens is attached to the front side 2 of a housing 3. The lens element 4 is used to project an image onto a round sensor 5 in the interior of the digital camera 1. The light-sensitive sensor 5 is embodied as a scanner or chip which electronically captures the image. The light-sensitive sensor 5 is usually disk-shaped. The lens of the lens element 4 which is known per se is circular so that the projected image behind the lens element is also circular. This circular image is designated as an image area which is projected by the lens element 4 and contains an object 6 which is to be imaged (see FIGS. 1d to 1g). The image information contained in the image area is captured electronically by the sensor 5 and digitized. The image information contained in the image area can be viewed by the user by means of a display 7 which is also circular. As displays 7 generally consume a large amount of power, the display can also be switched off and the user can view the image to be recorded through a viewfinder 8. The viewfinder 8 is also circular so that it can be used to view all the same image information as is imaged as an image area using the lens element 4. When the user has viewed and accepted the projected image, he can store in digitized form the image displayed in the viewfinder 8 or on the display 7 by actuating the trigger. The image is stored in an appropriate storage medium. The storage medium, for example a chip, is either integrated into the camera or can be taken out of it so that the digitized image information can be transferred, for example, to a computer.

FIGS. 1'a to 1'c shows the digital camera in FIGS. 1a to 1c in an oblique position. In such a case, the object is recorded at an angle with respect to the axis A. The recorded image can be rotated subsequently or simultaneously by digital means so that alignment with the axis A is achieved. Alternatively, an actuator motor 9 may be provided for the sensor 5, which is rotated in accordance with the oblique position measured by an oblique position sensor 9' so that the recorded image is aligned with the axis A as is represented in FIG. 1'h.

The use of the entire circular image area already mentioned is apparent from FIGS. 1d to 1g, said image area being projected by the lens element 4 of the digital camera 1. The entire image area is stored. The user is provided with the possibility of selecting one or more image excerpts 10, 11, 12, 13 from the image area after the image area has been stored. In this context, he can select, or determine himself, the position of the image excerpt 10, 11, 12, 13, the geometric shape and the size of the image excerpt 10, 11, 12, 13. A selected image excerpt 10, 11, 12, 13 can also be subsequently enlarged so that an enlarged image excerpt is produced which can in turn be stored or can output via an output medium, for example a printer.

Figure 4A:
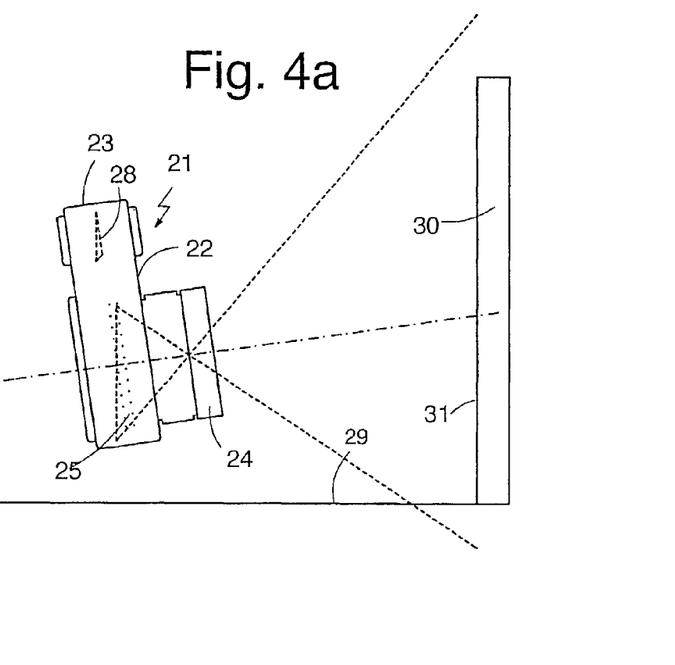
FIG. 4a is a side view of a digital camera according to the present invention recording an image.
Figure 4B:
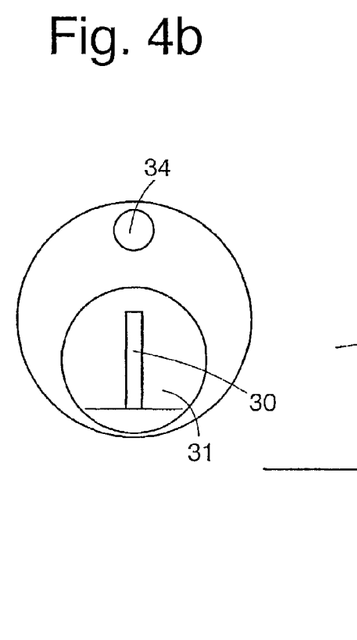
Figure 5A:
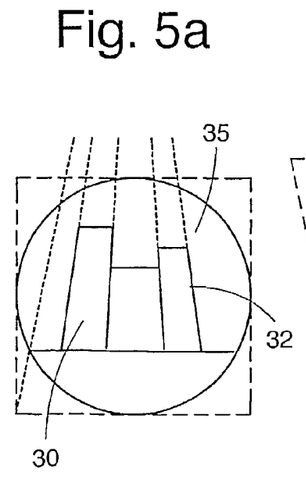
FIG. 5a is an image which is recorded without perspective equalization.
Figures 5B, 5C:
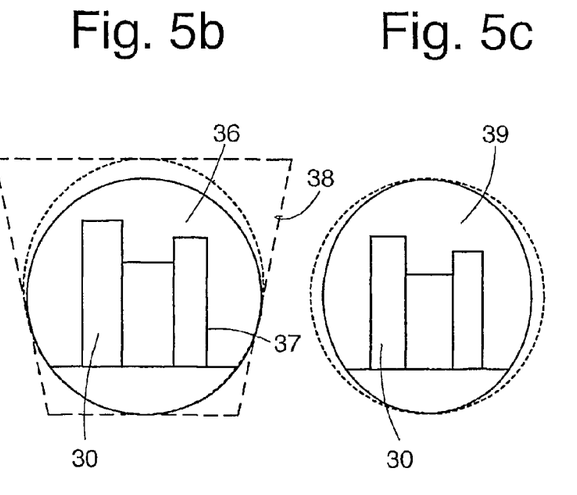
FIG. 5b is the image in FIG. 5a after perspective equalization.
FIG. 5c is an optimized image according to FIGS. 5a and 5b.

FIG. 4a is a schematic illustration of a digital camera 21. The lens element 24 with a lens is mounted on the front side 22 of the housing 23. The lens element 24 is used to project an image onto a sensor 25 in the interior of the digital camera 21. The light-sensitive sensor 25 is embodied as a scanner or chip which captures the image electronically. The light-sensitive sensor 25 is usually disk-shaped. The lens of the lens element 24 which is known per se is circular so that the projected image behind the lens element is also circular. However, the format of the recorded image is determined by the format of the sensor 25. In the prior art, the sensor 25 is frequently rectangular and therefore records just one excerpt of the image projected by the lens element 24. This projected image is referred to as an image area projected by the lens element 24. If the entire image area is to be recorded, the sensor 25 is also circular. The image information projected onto the sensor 25 is captured electronically by the sensor 25 and digitized. The digital camera also has a first inclination sensor 28. The inclination of the sensor 25 with respect to the horizontal 29 is measured using the first inclination sensor 28. In the recording of objects 30 which have lines 31 which are perpendicular to the horizontal 29, the perpendicular lines are imaged only as perpendicular lines if the sensor 25 is likewise perpendicular with respect to the horizontal 29. If the sensor surface is inclined with respect to the horizontal, the perpendicular lines 31 become tumbling lines 32 in the image (FIG. 5a). By means of the inclination measured by the inclination sensor 28 it is possible to equalize in terms of perspective the image projected by the lens element 24 in such a way that even when the digital camera is inclined the imaged lines become perpendicular again in the image (FIG. 5b). The equalization in accordance with the measured inclination value can be carried out automatically even before the recording so that the image which is equalized in terms of perspective can be viewed by the user by means of a display 33. As displays 33 generally consume a large amount of power, the display can also be switched off and the user can view the image to be recorded through a viewfinder 34. If the inclination sensor 28 is deactivated, the distorted image which is projected by the lens element 34 is displayed on the display 33 or in the viewfinder. If the user has viewed and accepted the projected image, he can store in digitized form the image displayed in the viewfinder 34 or on the display 33 by actuating the trigger. The image is stored in an appropriate storage medium. The storage medium, for example a chip, is either integrated into the camera or can be removed from it so that the digitized image information can be transferred, for example, to a computer. In addition, it is possible to store the images in an equalized form and to store the measured inclination with each image. The user is also provided with means with which he can equalize or distort an image before or after the recording in accordance with his wishes.

FIG. 5a shows an image 35 in the form in which it was recorded by an inclined digital camera without equalization. If the sensor 35 of an inclined digital camera is not aligned in parallel with objects 30 with perpendicular lines 31, these objects are not imaged with perpendicular lines 32 but rather with what are referred to as tumbling lines 32. FIG. 5a also shows the alignment of the tumbling lines at a vanishing point.

In the image 36 shown in FIG. 5b, the image which is projected by the lens element was equalized in terms of perspective in accordance with the inclination measured by the inclination sensor 28 in such a way that the perpendicular lines 31 of the photographed object 30 appear as perpendicular lines 37 in the image 36. As a result of the perspective equalization, the image which is recorded by a rectangular sensor 35 is distorted to form a trapezium 38 which is extended in length and/or width with respect to the rectangle according to FIG. 5a. If the format of the image is to be retained, the areas which are bounded by the dashed lines are removed. If an object 30 is photographed in portrait format, i.e. with the digital camera rotated, the inclination sensor 28, or a second inclination sensor, must also sense the inclination of the camera in this orientation. FIG. 5c shows a completely optimized image 39.

Figure 8:
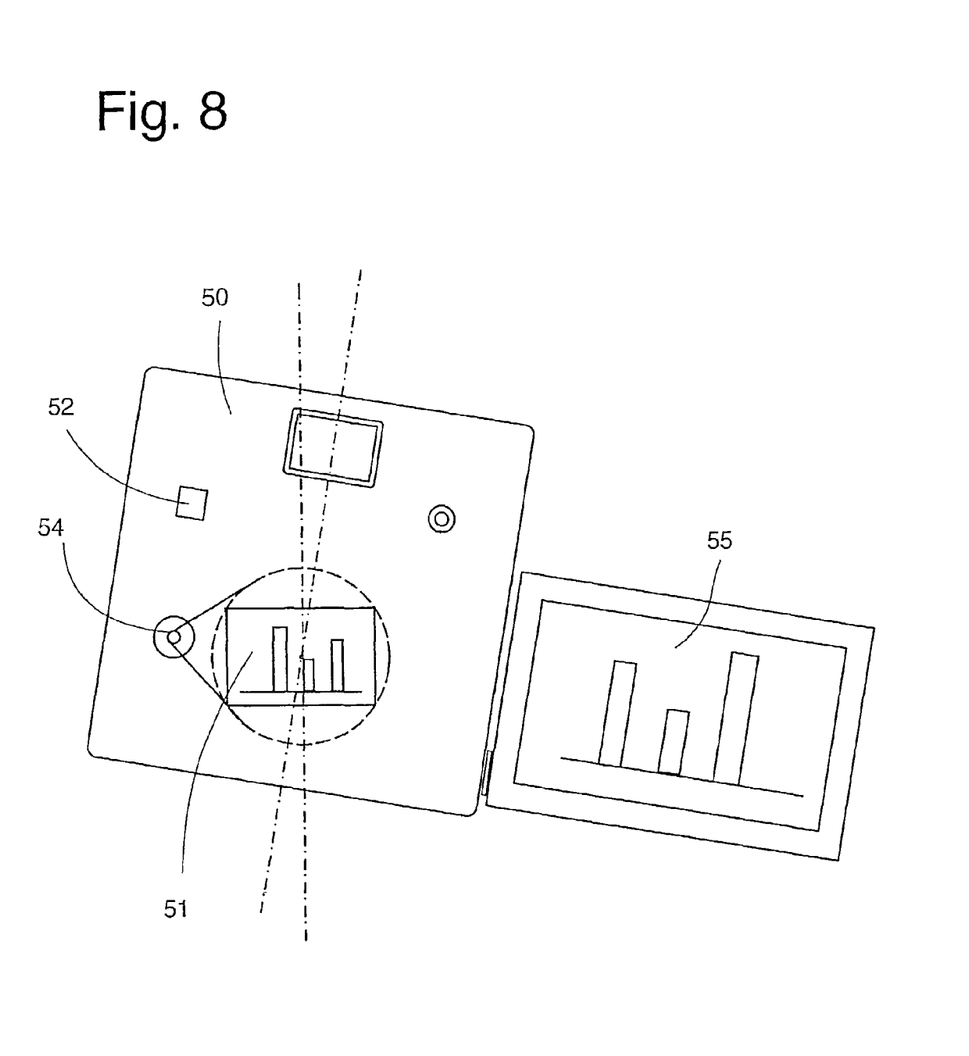
FIG. 8 is a rear view of a digital camera with a rotatable sensor.

FIG. 8 illustrates a digital camera 50 with rectangular sensor surface 51. The digital camera 50 is positioned obliquely. The oblique position is sensed by an oblique position sensor 52. According to the oblique position, the sensor surface is rotated by means of an actuator motor 54 so that an image such as would have been recorded if the camera were not positioned obliquely appears on the display 55. The image can be stored with this orientation. Instead of a rectangular sensor surface, a circular sensor surface can also be provided.

Figure 2A:
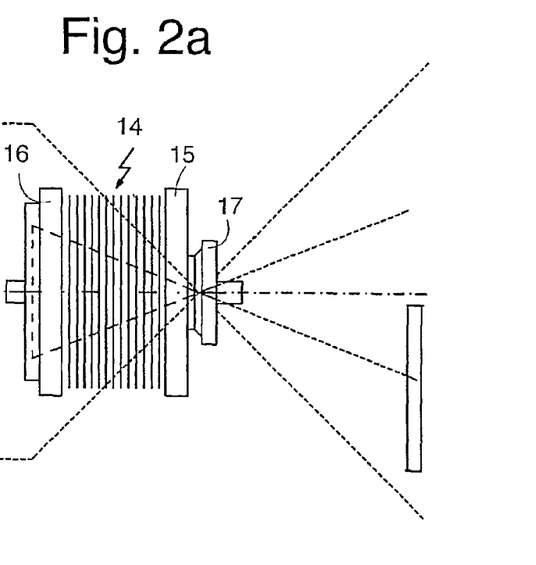
FIG. 2a is a plan view of a large image camera according to the prior art with a centered lens element.

FIG. 2a illustrates a large image camera 14 which is known from the prior art. The large image camera 14 has a front standard 15 with bellows, at the rear end of which there is a rear standard 16. The ground glass disk or film cassette which records the image projected by the lens element 17 is mounted in this rear standard 16. In FIG. 2a, the lens element 17 is not arranged with an offset with respect to the rest of the large image camera 14, in particular not in relation to the rear standard 16.

Figure 2B:
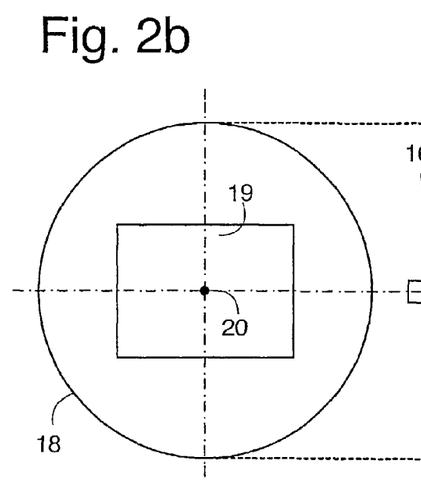
FIG. 2b is a schematic view of the image area projected by the lens element of the camera shown in FIG. 2a and of the part of the image area which is imaged.

The lens element 17 of the large image camera 14 which is shown in FIG. 2a projects an image area 18 which is shown in FIG. 2b. The projected image area 18 is larger than the size of the ground glass disk held by the rear standard 16. The large image camera 14 therefore records only an image excerpt 19 of the image area 18 whose size corresponds to the size of the ground glass disk. The center point 20 of the image excerpt 19 corresponds in this case to the center point of the lens element 17. The lens element 17 of the large image camera in FIG. 2a was not arranged with an offset, and the image excerpt 19 recorded by the large image camera 14 is therefore located approximately in the center of the image area 18.

If another image excerpt of the image area is to be recorded, the lens element 17 and rear standard 16 must be displaced with respect to one another while the camera position remains the same.

Figures 3A, 3B:
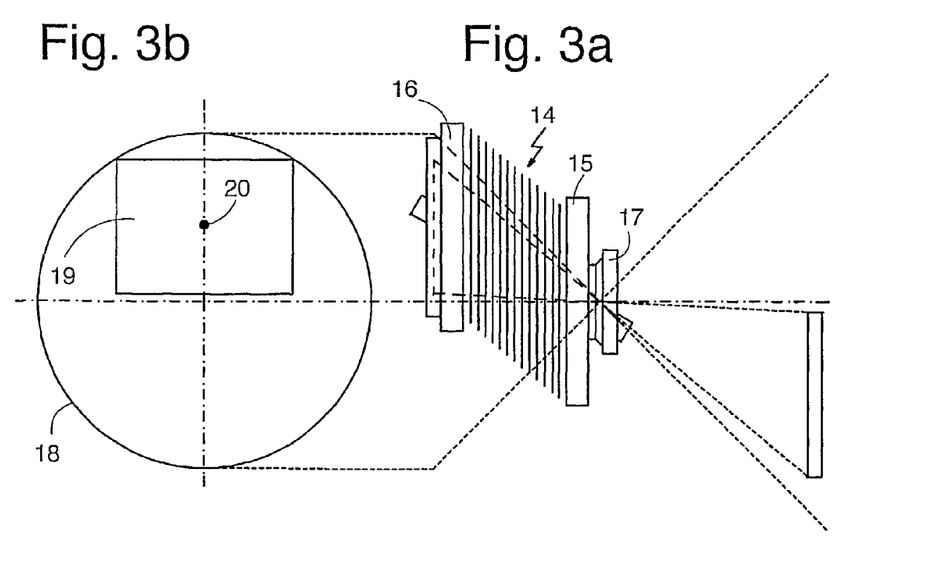
FIG. 3a is a plan view of a large image camera of the prior art with the lens element which is displaced to the side.
FIG. 3b is a schematic view of the image area which is projected by the lens element of the camera shown in FIG. 3a, and of the part of the image area which is imaged.

FIG. 3a likewise shows the large image camera 14 of FIG. 2a, in this case the lens element 17 of the large image camera 14 being displaced to the side, i.e. it is displaced with respect to the rear standard 16.

FIG. 3b shows the image area 18 which is already known from FIG. 2b, and the corresponding image excerpt 19. By displacing the lens element 17, the image area 18 projected by the lens element has also been displaced to the side. However, the position of the rear standard 16 remains the same so that an image excerpt 19 which is likewise displaced is recorded in the lateral region of the image area 18. The same effect would have been obtained in the opposite direction if the position of the lens element 17 had been retained and the rear standard 16 had been displaced to the other side.

Figure 6A:
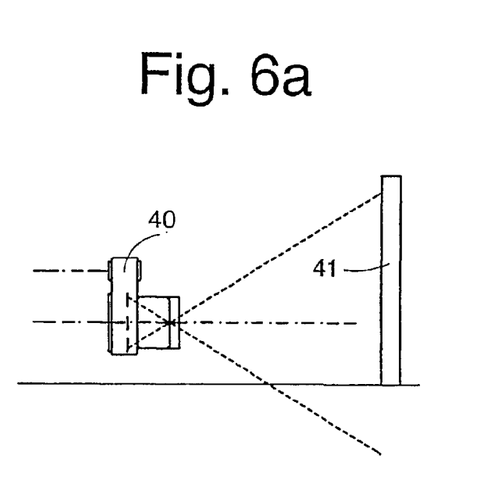
FIG. 6a is a side view of a camera according to the prior art recording an image.
Figure 6B:
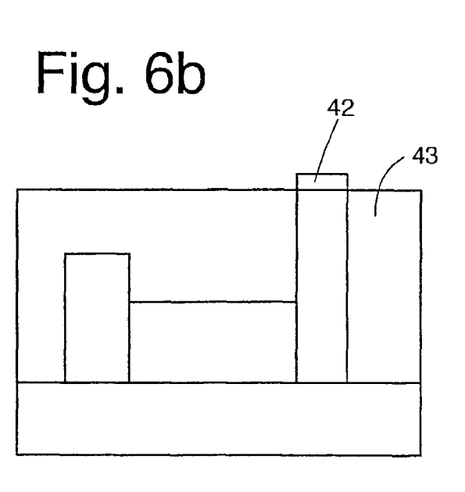
Figure 7A:
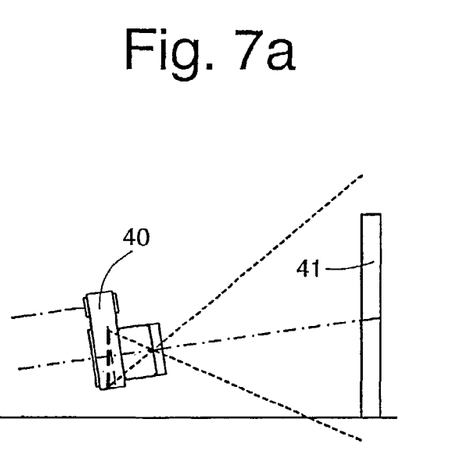
FIG. 7a is a side view of a camera according to the prior art recording an image.
Figure 7B:
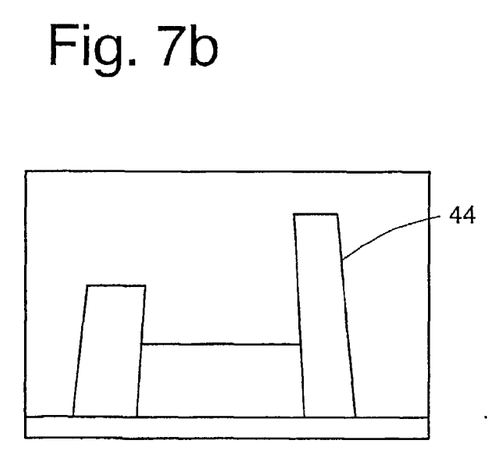

FIGS. 6 and 7 demonstrate the problems which occur when an image is recorded using a camera according to the prior art.

If the sensor of the camera 40 is aligned in parallel with the object 41 (FIG. 6a), tumbling lines are avoided. However, a part 42 of the object 41 is missing from the image 43 (FIG. 6b).

If the sensor of the camera 40 is arranged at an incline with respect to the object 41 (FIG. 7a), tumbling lines occur (FIG. 7b).

Figure 9:
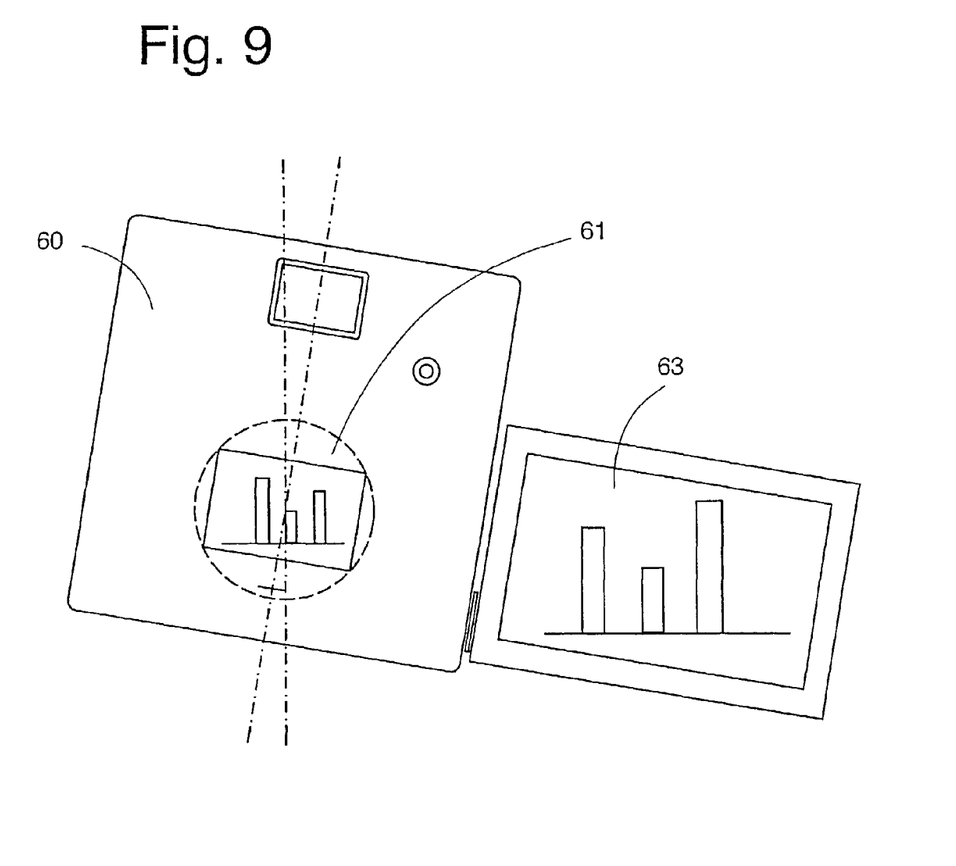
FIG. 9 is a rear view of a digital camera of the prior art with a fixed sensor.

FIG. 9 shows a digital camera 60 according to the prior art, in which no rotation of the sensor 61 is provided. When the digital camera 60 is positioned obliquely, the image on the display 63 likewise appears obliquely and can only be stored in such a form. The explanations also apply in a similar way to a video camera.

What is claimed is:

1. A method for capturing at least one of digitized single images and videos in a camera having a lens element with an image area, said method comprising:

capturing image information for the entire image area imaged by the lens element;

digitizing the captured image information to form a digitized image;

storing the digitized image;

equalizing or distorting a perspective of the digitized image by automatically equalizing the digitized image in response to an inclination angle measured by a first inclination sensor such that actual perpendicular lines are imaged as perpendicular lines, the inclination angle being the angle of inclination between the lens element and horizontal;

storing the equalized or distorted digitized image; and storing the measured inclination angle with each recorded image.

2. The method of claim 1, further comprising manually distorting the digitized images.

3. The method of claim 1, further comprising selecting an image excerpt from one of a stored image and the image area.

4. The method of claim 3, further comprising the step of equalizing or distorting a perspective of the image excerpt.

5. The method of claim 4, wherein said step of equalizing or distorting comprises automatically equalizing the image excerpt in response to the inclination angle measured by a first inclination sensor such that actual perpendicular lines are imaged as perpendicular lines.

6. The method of claim 3, further comprising manually equalizing or distorting the image excerpt.

7. A device for reproducing digitized images including:
   means for capturing an entire digitized image area imaged by a lens element;
   a display for displaying the entire digitized image area imaged by the lens;
   a first inclination sensor;
   means for equalizing or distorting a perspective of the digitized images and displaying the equalized or distorted digitized image on said display, said means for equalizing or distorting comprising means for automatically equalizing the digitized image in response to an inclination angle measured by said first inclination sensor such that actual perpendicular lines are displayed as perpendicular lines on said display, the inclination angle being the angle of inclination between the lens element and horizontal; and
   means for storing the equalized or distorted digitized image and storing the measured inclination with each recorded image.

8. The device of claim 7, further comprising means for manually distorting the digitized images and displaying the equalized or distorted digitized image.

9. The device of claim 7, further comprising means for selecting an image excerpt from the image area and displaying the image excerpt.

10. The device of claim 9, further comprising means for equalizing or distorting a perspective of the image excerpt and displaying the equalized or distorted image excerpt.

11. The device of claim 10, further comprising means for manually equalizing or distorting the image excerpt.

12. A method for capturing at least one of digitized single images and videos in a camera having a lens element with an image area, said method comprising:
   capturing image information imaged by the lens element;
   digitizing the captured image information to form a digitized image;
   storing the digitized image;
   equalizing or distorting a perspective of the digitized image by automatically equalizing the digitized image in response to an inclination angle measured by a first inclination sensor such that actual perpendicular lines are imaged as perpendicular lines, the inclination angle being the angle of inclination between the lens element and horizontal; and
   storing the equalized or distorted digitized image, wherein said step of automatically equalizing includes measuring the inclination by the first inclination sensor and storing the measured inclination with each recorded image.

13. The method of claim 12, wherein said step of equalizing or distorting comprises manually distorting the digitized images.

14. The method of claim 12, further comprising selecting an image excerpt from one of a stored image and the image area.

15. The method of claim 14, further comprising the step of equalizing or distorting a perspective of the image excerpt.

16. The method of claim 15, wherein said step of equalizing or distorting comprises automatically equalizing the image excerpt in response to the inclination angle measured by the first inclination sensor such that actual perpendicular lines are imaged as perpendicular lines.

17. The method of claim 14, further comprising manually equalizing or distorting the image excerpt.

18. The method of claim 12, further comprising the step of detecting the oblique position of the camera around an axis extending perpendicular to the plane of the sensor by an oblique position sensor, and automatically correcting the oblique position into the horizontal.

* * * * *